United States Patent
Shatdal

(10) Patent No.: US 7,003,508 B1
(45) Date of Patent: Feb. 21, 2006

(54) PARTITIONING DATA IN A PARALLEL DATABASE SYSTEM

(75) Inventor: Ambuj Shatdal, Madison, WI (US)

(73) Assignee: NCR Corp., Dayton, OH (US)

( * ) Notice: Subject to any disclaimer, the term of this patent is extended or adjusted under 35 U.S.C. 154(b) by 474 days.

(21) Appl. No.: 10/382,691

(22) Filed: Mar. 6, 2003

(51) Int. Cl.
*L06F 17/30* (2006.01)

(52) U.S. Cl. ...................... 707/2; 707/104.1

(58) Field of Classification Search ............. 707/1, 707/2, 3, 5, 10, 101, 102, 104.1; 709/232; 711/114; 712/30; 714/4
See application file for complete search history.

(56) References Cited

U.S. PATENT DOCUMENTS

| | | | |
|---|---|---|---|
| 5,640,584 A | 6/1997 | Kandasamy et al. | 712/30 |
| 5,864,842 A | 1/1999 | Pederson et al. | 707/3 |
| 5,870,746 A | 2/1999 | Knutson et al. | 707/101 |
| 5,872,904 A | 2/1999 | McMillen et al. | 714/4 |
| 5,884,299 A | 3/1999 | Ramesh et al. | 707/2 |
| 6,691,166 B1 * | 2/2004 | Gasior et al. | 709/232 |

OTHER PUBLICATIONS

Mahapatra et al., Oracle parallel Processing, 2001, pp. 1-19.*
Michael Otey, Teradata 3.0.1 for Windows NT, Jul. 2000, pp. 1-10.*
Shen et al., Adaptive Partitioning Using Probability, Dec. 2003, pp. 1-18.*

* cited by examiner

*Primary Examiner*—Apu Mofiz
(74) *Attorney, Agent, or Firm*—Trop, Pruner & Hu P.C.

(57) ABSTRACT

A parallel database system includes multiple processing units and associated storage modules. To achieve even distribution of workload, rows of a table are distributed as evenly as possible across the multiple processing units using a predefined partitioning algorithm. The predefined partitioning algorithm defines groups and probabilities assigned to boundary points defining the groups. Partitioning of data is based on the boundary points and the assigned probabilities.

34 Claims, 2 Drawing Sheets

PARTITIONING DATA IN A PARALLEL DATABASE SYSTEM

BACKGROUND

A database system stores collections of logically related data. One common type of database system is the relational database management system (RDBMS), which stores data in tables (or relations) that are arranged as rows and columns. To access data in a database system, requests according to a standard database query language are submitted to the database system to retrieve, update, or delete data, as well as to manipulate various objects in the database system, including tables, definitions of tables, and so forth.

As computer technology has progressed, database systems are able to store increasing amounts of data. In some cases, parallel database systems are used to store and process massive amounts of data. A parallel database system typically includes multiple processing units that enable the concurrent access and manipulation of data within the database system. One example type of such a parallel database system is the TERADATA® database system from NCR Corporation.

One of the issues associated with a parallel database system is the partitioning of data across multiple processing units. There are various types of partitioning schemes, including hash partitioning and range-based partitioning. Hash partitioning refers to storing a particular row in a particular processing unit based on a hash value associated with the row. This hash value is typically generated by applying a value of an attribute (or multiple attributes) within the row through some hashing algorithm to derive a hash value. Each processing unit can be associated with one or more hash values, such that a row associated with a given hash value is stored in the corresponding processing unit.

A range-based partitioning scheme involves assigning a range of attribute values to each processing unit, such that a row that contains an attribute within that range is stored in the corresponding processing unit. The range-based partitioning scheme usually works well if (1) there are sufficiently many unique values in the data, and (2) there is generally an equal number of rows for each data value. If either of these conditions is not met, then range partitioning results in uneven distribution of rows across the processing units. If uneven distribution of rows occurs, the amount of data to be processed by at least one processing unit is substantially greater than the amount of data to be processed by other processing units. As a result, the load across the processing units will become unbalanced, which may result in reduced parallelism of a database system.

SUMMARY

In general, improved methods and apparatus are provided to enhance parallelism in a parallel database system. For example, a method for use in a parallel database system comprises assigning probabilities to boundary points of defined groups of values of a partitioning attribute, and partitioning data across the plural processing units of the parallel database system based at least in part on the probabilities assigned to the boundary points.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
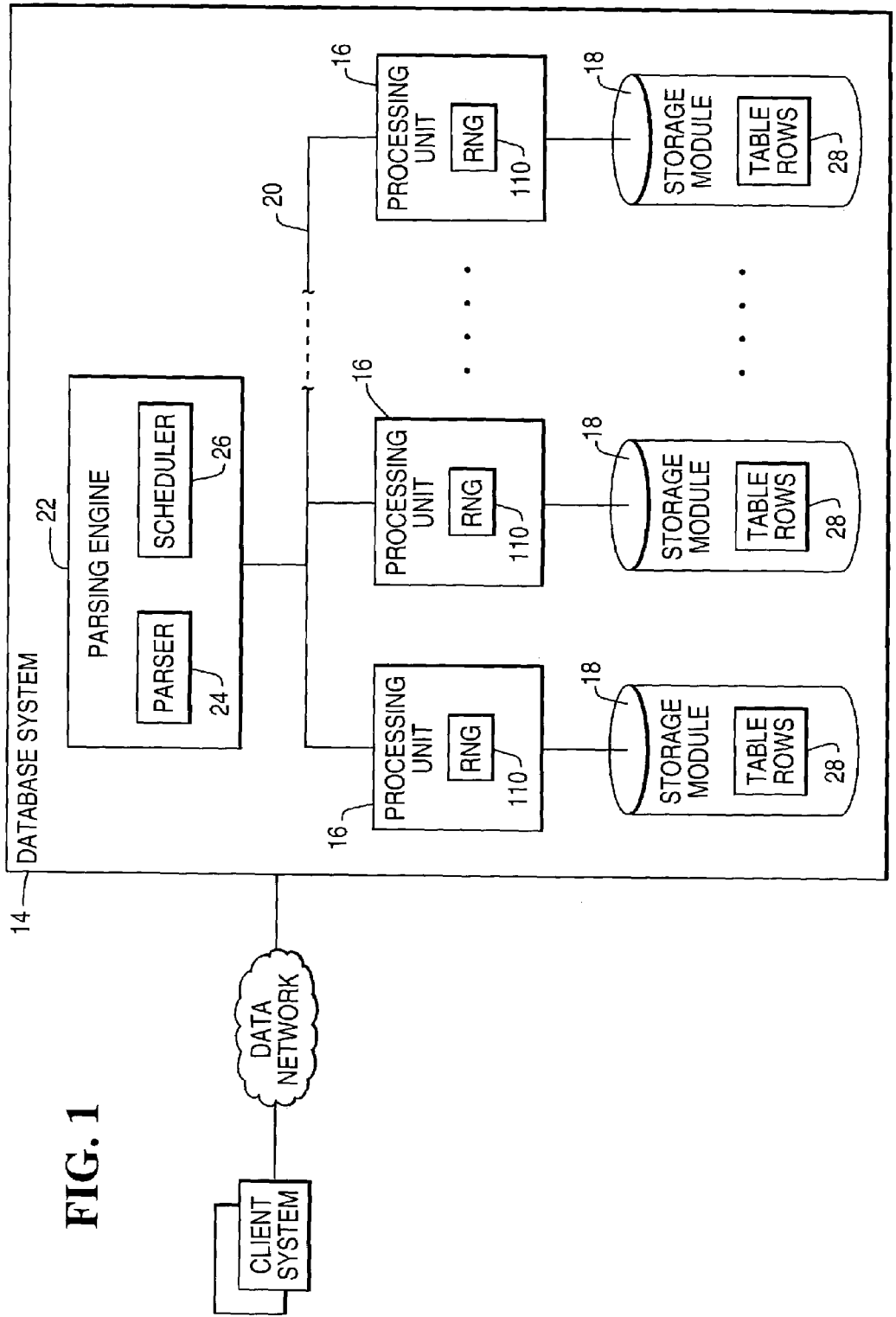
FIG. 1 is a block diagram of an example arrangement that includes a parallel database system.

FIG. 1 shows an example arrangement in which a client system 10 (or multiple client systems) is coupled to a database system 14 over a data network 12. Examples of the data network 12 include a local area network (LAN), a wide area network (WAN), the Internet, and so forth. The client system 10 is capable of issuing queries according to a standard database query language to the database system 14 to access (retrieve or update) or to create or alter data structures (e.g., tables, rows, and so forth). One example of a standard database query language is the Structured Query Language (SQL) as promulgated by the American National Standards Institute (ANSI).

The database system 14 is a parallel database system having multiple processing units 16 that manage access of data stored in respective storage modules 18. The storage modules 18, although shown as discrete components, can be part of one storage subsystem. Each processing unit 16 can be implemented as software, hardware, or a combination of both. In one embodiment, each processing unit 16 is based on an access module processor (AMP) used in some TERADATA® database systems from NCR Corporation.

Examples of tasks performed by each of the processing units 16 include the following: inserting, deleting, or modifying contents of tables stored in respective storage modules 18; creating, modifying, or deleting definitions of tables; retrieving information from definitions and tables; and locking databases and tables.

The processing units 16 are coupled over an interconnect layer 20 to a parsing engine 22, which includes a parser 24 and a scheduler 26. The parser 24 receives database queries (such as those submitted by the client system 10), parses the received queries, and generates executable steps. The scheduler 26 sends the executable steps generated by the parser 24 to the processing units 16 over the interconnect layer 20.

In accordance with some embodiments, to enhance parallelism when accessing data in the storage modules 18, data is partitioned across the processing units 16 according to a predefined partitioning algorithm. As shown in FIG. 1, the partitioned data includes table rows 28 stored in respective storage modules 18. A given table T has N rows, with the N rows partitioned across the processing units 16. To balance the load across the processing units 16 as much as possible, the partitioning algorithm is designed such that the numbers of table rows 28 stored in the storage modules 18 differ as little as possible, even when data is skewed.

In one embodiment, the predefined partitioning algorithm is a range-based partitioning algorithm that defines boundary points and associated groups of values of an attribute on which partitioning is based (referred to as the partitioning attribute). The partitioning attribute is contained in each row of a given table. To identify boundary points, a subset of rows (e.g., a collected sample of rows) of a table are evenly divided into multiple groups so that each group has substantially the same number of rows. The rows within each group have respective partitioning attribute values. One of the partitioning attribute values from each group (e.g., starting or ending partitioning attribute value in each group) is selected as the boundary point, resulting in multiple boundary points selected for multiple groups. Partitioning of rows of a table across the processing units is based on the boundary points (and as described further below, probabilities assigned to the boundary points).

The range-based partitioning algorithm according to some embodiments differs from conventional partitioning algorithms. The following example illustrates this. Assume a table with attributes (a, b, c, d), with range-based partitioning being based on values of the attribute b (attribute b in this example is the partitioning attribute). Suppose there are multiple defined ranges, e.g., range 1, range 2, range 3, range 4. Assume also that there are four processing units, with a first processing unit assigned to store rows containing values of partitioning attribute b within range 1, a second processing unit to store rows containing values of attribute b within range 2, and so forth. If the numbers of rows of the table are relatively uniform with respect to values of partitioning attribute b, then uniform partitioning can be achieved with the range-based partitioning scheme in which the numbers of rows of the table stored in the storage modules 18 are relatively close to each other. However, if the numbers of rows associated with the attribute b values are skewed, then uniform distribution of rows may not be achievable using conventional range-based partitioning algorithms. That is because with a range-based partitioning algorithm, rows having the same data points (values of the partitioning attribute b) are stored on the same storage module 18. For example, assume a table with 100 rows, in which 70 of the rows have values of the partitioning attribute b that fall within one range, with the other rows containing partitioning attribute values that fall within other ranges. As a result, 70% of the rows are stored in one storage module associated with one processing unit, while 30% of the rows are distributed across the other processing units. That means that the processing unit that handles the 70% of the rows will have a much greater workload, which causes a bottleneck situation during processing of data in the table. This may slow down query processing under certain situations.

To address this issue, especially when high skew exists in the numbers of rows associated with unique partitioning attribute values, the predefined partitioning algorithm according to some embodiments assigns probabilities to boundary points of defined groups of partitioning attribute values. Boundary points are points that identify the boundary between groups. The boundary points can be the beginning point of each group or the ending point of each group. Partitioning of data is based on both the defined groups (boundary points) as well as the probabilities assigned to the boundary points of the groups. The probabilities are selected to more or less evenly distribute rows across multiple processing units even if high skew exists in the distribution of rows according to partitioning attribute values. If high skew exists in the distribution of rows according to attribute values, two or more boundary points may have the same value. When this occurs, different probabilities are assigned to the boundary points having the same value so that even distribution of rows across processing units can be achieved.

For example, assume there are M processing units, with M groups defined such that each processing unit is associated with one group. Note that, in other examples, more than M groups can be defined so that at least some of the processing units are associated with more than one group. Assume each group has boundary points $E_{i\_start}$ and $E_{i\_end}$, where $E_{i\_start}$ is the starting boundary point and $E_{i\_end}$ is the boundary end point for the ith group. Note that in some groups, $E_{i\_start}$ may be equal to $E_{i\_end}$. A probability can be assigned to one of the boundary points $E_{i\_start}$ and $E_{i\_end}$, with distribution of rows based on this assigned probability.

Figure 2:
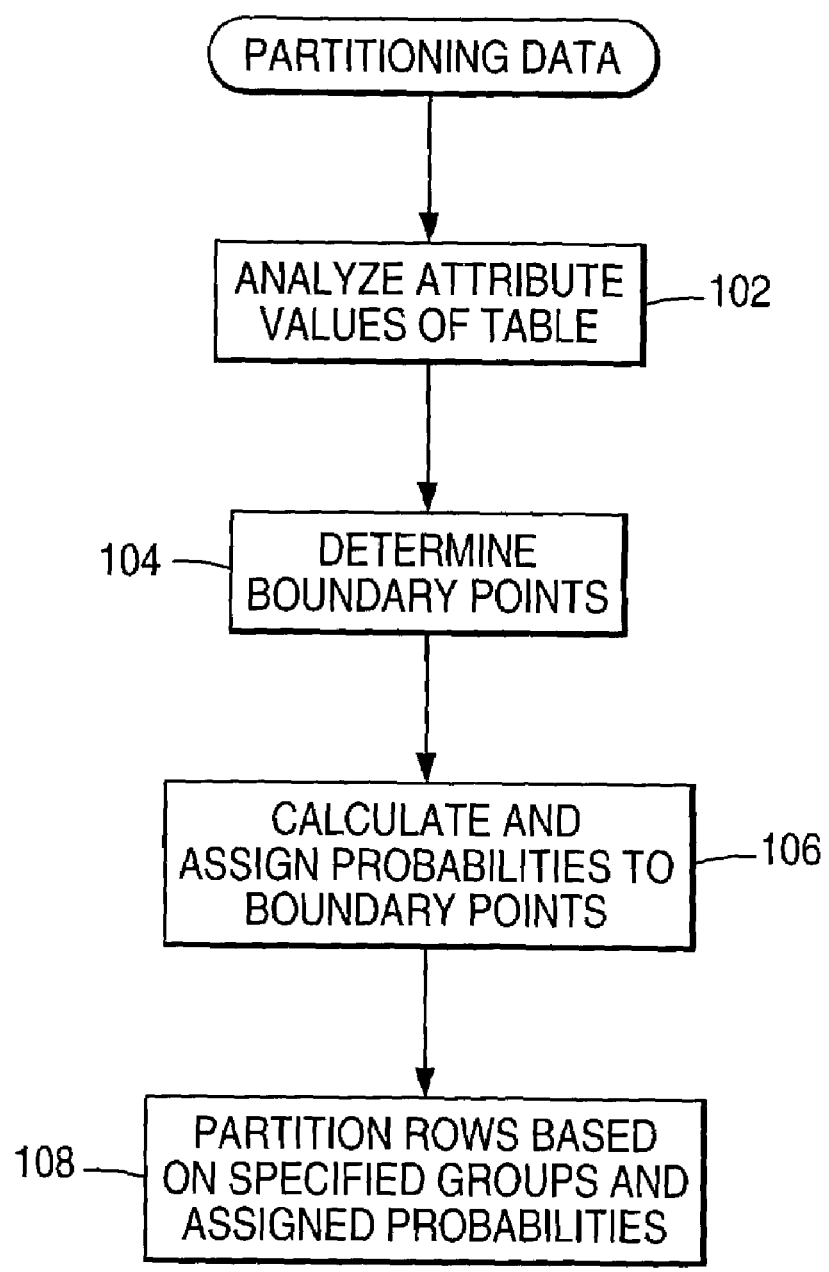
FIG. 2 is a flow diagram of a process of partitioning data according to one embodiment.

FIG. 2 shows a flow diagram of a process of partitioning data according to one embodiment. Before partitioning is performed, all rows of a given table may be stored on one storage module. Alternatively, the rows may be stored across the multiple storage modules 18 of the database system 14. In either case, partitioning can be performed to more evenly distribute the rows across the multiple processing units 16. According to one embodiment, the process of FIG. 2 is performed by a selected one of the processing units 16, referred to as the control processing unit. However, in another embodiment, the process of FIG. 2 is performed by multiple processing units.

The control processing unit analyzes (at 102) the values of the partitioning attribute in the rows of a table. As noted above, the partitioning attribute is the attribute in a row on which range-based partitioning is to be performed.

As an example, assume a table has rows with the following attributes (a, b, c, d). Assume further that the partitioning of rows across the multiple processing units 16 is based on values of the partitioning attribute c. In this example, the control processing unit analyzes (at 102) the values of the partitioning attribute c.

Because the amount of data stored in the database system 14 can be massive, sampling can be used when analyzing data. Thus, a sample of rows of the table can be collected, with the analysis performed on the sample rows (instead of on all rows of the table). For example, the sample of rows can be some percentage of the total rows of the table. Alternatively, instead of sampling, statistics can be collected and used instead to evenly distribute rows according to the predefined algorithm.

The control processing unit then determines (at 104) boundary points based on the distribution of the values of the partitioning attribute (e.g., attribute c in the above example) in the sample rows. The sampled partitioning attribute values are evenly divided by the number of processing units to determine the boundary points and groups of attribute values. For example, assume there are N sample rows (with corresponding N partitioning attribute values). The N partitioning attribute values are divided by M (the number of processing units). N/M produces an integer value L. The N partitioning attribute values are thus divided into L groups. Note that if the division of N by M produces a remainder, the remaining partitioning attribute values are placed as extra points in some of the groups. In this case, some of the groups may have more data points than other groups. In one implementation, the boundary point is selected as the last point of each group.

In one example, assume from a large data set a sample of 1, 4, 4, 4, 4, 5, 5, 6, 8, 10, 10, 10, 10, 10, 15, 15, which are values of the partitioning attribute, is collected. Assume further that there are five processing units 16. An even range distribution of this sample results in the following groups: [1, 4, 4, 4], referred to as group 1; [4, 5, 5], referred to as group 2; [6, 8, 10], referred to as group 3; [10, 10, 10], referred to as group 4; and [10, 15, 15], referred to as group 5. Note that group 1 has one more point than the other groups. If the selected boundary point is the last point in each group, then the boundary points are 4 (the last point of group 1), 5 (the last point of group 2), 10 (the last point of group 3), and 10 (the last point of group 4). Note that the last point of the last group (group 5) is not selected as a boundary point.

Next, the control processing unit calculates and assigns (at 106) probabilities to respective boundary points. In the above example, the boundary points are 4, 5, 10, 10. In one implementation, the probabilities are calculated by counting the number of occurrences of the boundary value in the current group and preceding group and dividing the number of occurrences by the total number of occurrences of the value. Thus, in the above example, there are three occurrences of the boundary point 4 in group 1. The total number of occurrences of the value 4 is 4; therefore, the probability for the boundary point 4 is ¾ (0.75). Similarly, for the boundary point 5, the total number of occurrences of the boundary value 5 in group 2 (and the preceding group 1) is 2. The total number of occurrences of the value 5 is also 2. Therefore, the probability calculated for the boundary point 5 is 1. Similarly, for the first boundary point 10, the number of occurrences of the value 10 in group 3 (and preceding group 2) is 1. The total number of occurrences of the value 10 is 5; therefore, the probability assigned to the first boundary point 10 is ⅕ (0.2). For the second boundary point 10, the number of occurrences of 10 in group 4 (and preceding group 3) is 4, while the total number of occurrences of the value 10 is 5. Therefore, the probability assigned to the second boundary point 10 is ⅘ (0.8). Based on these calculations, the final range boundaries are 4 p(0.75), 5 p1.0), 10 p(0.2), 10 p(0.8). The designation p(x) indicates the probability x associated with the boundary point.

Note that in the case where multiple boundary points have the same values (such as boundary point 10 above), the probability assigned is a cumulative probability that increases with each repeated boundary point.

The control processing unit next partitions (at 108) the rows of the table based on the specified ranges and assigned probabilities. Generally, boundary points $B_1, B_2, \ldots, B_n$, define boundary points to partition data across n+1 processing units. In some cases, two or more of the boundary points are equal. For a row containing a partitioning attribute value y that is less than $B_1$, that row is stored in the first processing unit. For a row that contains a partitioning attribute value of $B_1$, a "toss" is performed. A toss involves the generation of a random number z by a random number generator 110 (FIG. 1). This random number z is a value between 0 and 1. Assume boundary point $B_1$ has the probability $x_{B1}$. If the toss value z is less than or equal to $x_{B1}$, then the corresponding row is stored in the storage module associated with the first processing unit. If the value z is greater than x, then the row is stored in the storage module associated with the second processing unit (assuming $B_2$ $B_1$).

However, if the value of $B_2$ is equal to $B_1$, the control processing unit further compares the toss value z to the probability $x_{B2}$ associated with boundary point $B_2$. If $z<x_{B2}$, then the row is stored in the storage module associated with the second processing unit. However, if $z>x_{B2}$, then the row is stored in the storage module associated with the third processing unit (assuming $B_2$ $B_3$). If $B_3$ is equal to $B_2$, then a further comparison that is the same as above is performed.

Generally, given boundary points $B_1 \ldots B_n$ that define n+1 groups for n+1 processing units, a row having partitioning attribute value y is placed in processing unit i if $B_{i-1}<y<B_i$. However, if $y>B_i$, then a toss is performed to generate a random number z that is compared to the probability $x_{Bi}$ associated with boundary point $B_i$. If z x, then the row is stored in processing unit i. If $z>x_{Bi}$ then the row is stored in processing unit i+1 if $B_i$ $B_{i+1}$.

However, if $B_{i+1}=B_i$, then a further comparison of z is made with $X_{Bi+1}$ (probability assigned to boundary points $B_{i+1}$). For every $B_{i+j}$, j=1, 2, . . . , where $B_{i+j}=B_i$, successive comparisons are made between z and $X_{Bi+j}$ to determine which of the plural processing unite i+1, . . . , i+j is to be selected to store the row.

Note that the above describes one embodiment of the invention. Other embodiments can employ other variations.

Instructions of the various software routines or modules discussed herein (e.g., processing units, parsing engine, and so forth) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routine or modules) are stored in a storage, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to the database system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a parallel database system having plural processing units, comprising:
   assigning probabilities to boundary points of defined groups of values of a partitioning attribute; and
   partitioning data across the plural processing units based at least in part on the boundary points and the probabilities assigned to the boundary points.

2. The method of claim 1, wherein partitioning the data comprises partitioning rows of a table across the plural processing units, each row containing the partitioning attribute.

3. The method of claim 1, further comprising defining the groups based on values of the partitioning attribute in respective rows of a table, wherein the boundary points comprise selected values of the partitioning attribute.

4. The method of claim 3, further comprising determining the boundary points by evenly distributing rows across the plural processing units.

5. The method of claim 4, further comprising dividing the partitioning attribute values into the groups corresponding to the plural processing units,
wherein determining the boundary points comprises selecting an ending partitioning attribute value in each group as the boundary point.

6. The method of claim 4, further comprising dividing the partitioning attribute values into plural groups corresponding to the plural processing units,
wherein determining the boundary points comprises selecting a boundary partitioning attribute value in each group as the boundary point.

7. The method of claim 4, further comprising collecting a sample of rows of the table,
wherein evenly distributing the rows comprises evenly distributing the sample rows.

8. The method of claim 4, further comprising collecting statistics, wherein evenly distributing the rows is based on the statistics.

9. The method of claim 4, wherein a plurality of the boundary points have the same value.

10. The method of claim 9, wherein assigning the probabilities to the boundary points comprises assigning cumulative probabilities.

11. The method of claim 3, further comprising assigning the plural processing units to the defined groups, wherein partitioning data across the plural processing units comprises:
for each row of a table, determining that a value of the partitioning attribute in the row falls within a given one of the groups;
generating a number between 0 and 1;
assigning the row to the processing unit corresponding to the given group if the number is less than the probability assigned to the boundary point of the given group; and
assigning the row to another processing unit if the number is greater than the probability assigned to the boundary point of the given group.

12. The method of claim 11, wherein generating the number between 0 and 1 comprises generating a random number between 0 and 1.

13. A parallel database system comprising:
M processing units; and
a controller to:
assign probabilities to boundary points of defined groups of values of a partitioning attribute; and
partition data across the M processing units based at least in part on the probabilities assigned to the boundary points.

14. The parallel database system of claim 13, wherein the data comprises rows of a table.

15. The parallel database system of claim 13, wherein the controller comprises one or more of the M processing units.

16. The parallel database system of claim 13, further comprising a storage to store a table containing plural rows, the controller to determine the boundary points by defining L groups derived by evenly distributing N of the rows across the M processing units, where L is an integer calculated by dividing N by M.

17. The parallel database system of claim 16, the controller to further sample the N rows.

18. The parallel database system of claim 16, wherein each boundary point is an ending partitioning attribute value in a corresponding one of the L groups.

19. The parallel database system of claim 16, wherein each boundary point is a boundary partitioning attribute value in a corresponding one of the L groups.

20. The parallel database system of claim 13, wherein a plurality of the boundary points have the same value.

21. The parallel database system of claim 20, wherein the probabilities comprise cumulative probabilities.

22. The parallel database system of claim 13, the controller to assign the plural processing units to defined groups, the controller to partition data across the plural processing units by:
for each row of a table, determining that a value of the partitioning attribute in the row falls within a given one of the groups;
generating a number between 0 and 1;
assigning the row to the processing unit corresponding to the given group if the number is less than the probability assigned to the boundary point of the given group; and
assigning the row to another processing unit if the number is greater than the probability assigned to the boundary point of the given group.

23. The parallel database system of claim 22, wherein the number between 0 and 1 comprises a random number between 0 and 1.

24. The parallel database system of claim 23, wherein the controller comprises a random number generator to generate the random number between 0 and 1.

25. An article comprising at least one storage medium containing instructions that when executed cause a parallel database system with plural processing units to:
assign probabilities to boundary points of defined groups of values of a partitioning attribute; and
partition data across the plural processing units based at least in part on the probabilities assigned to the boundary points.

26. The article of claim 25, wherein the instructions when executed cause the parallel database system to further define the groups based on values of the partitioning attribute in respective rows of a table, wherein the boundary points comprise selected values of the partitioning attribute.

27. The article of claim 26, wherein the instructions when executed cause the parallel database system to further determine the boundary points by evenly distributing rows across the plural processing units.

28. The article of claim 27, wherein the instructions when executed cause the parallel database system to further divide the partitioning attribute values into the groups corresponding to the plural processing units,
wherein determining the boundary points comprises selecting an ending partitioning attribute value in each group as the boundary point.

29. The article of claim 27, wherein the instructions when executed cause the parallel database system to further divide the partitioning attribute values into the groups corresponding to the plural processing units,
wherein determining the boundary points comprises selecting a boundary partitioning attribute value in each group as the boundary point.

30. The article of claim 27, wherein the instructions when executed cause the parallel database system to further collect a sample of rows of the table,
wherein evenly distributing the rows comprises evenly distributing the sample rows.

31. The article of claim 27, wherein a plurality of the boundary points have the same value.

32. The article of claim 31, wherein assigning the probabilities to the boundary points comprises assigning cumulative probabilities.

33. The article of claim 26, wherein the instructions when executed cause the parallel database system to further assign the plural processing units to defined groups, wherein partitioning data across the plural processing units comprises:
- for each row of a table, determining that a value of the partitioning attribute in the row falls within a given one of the groups;
- generating a number between 0 and 1;
- assigning the row to the processing unit corresponding to the given group if the number is less than the probability assigned to the boundary point of the given group; and
- assigning the row to another processing unit if the number is greater than the probability assigned to the boundary point of the given group.

34. The article of claim 33, wherein generating the number between 0 and 1 comprises generating a random number between 0 and 1.

\* \* \* \* \*